Oct. 11, 1932.  C. E. MASON  1,881,798
CONTROL MECHANISM
Filed May 12, 1930
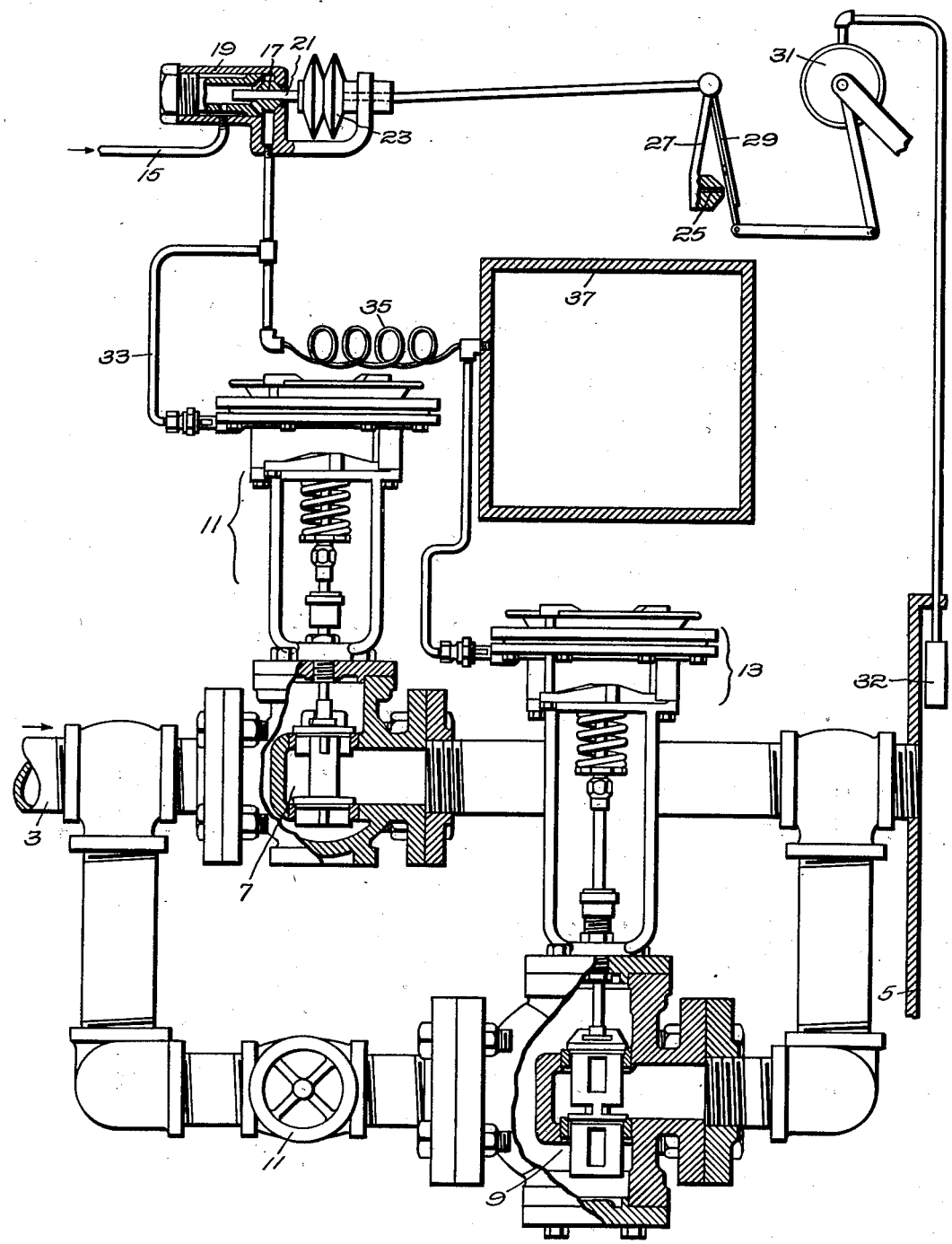
Inventor:
Clesson E. Mason
by Emery, Booth, Varney & Townsend
Attys Patented Oct. 11, 1932

1,881,798

UNITED STATES PATENT OFFICE

CLESSON E. MASON, OF FOXBORO, MASSACHUSETTS, ASSIGNOR TO THE FOXBORO COMPANY, OF FOXBORO, MASSACHUSETTS, A CORPORATION OF MASSACHUSETTS

CONTROL MECHANISM

Application filed May 12, 1930. Serial No. 451,592.

This invention relates to mechanism for controlling the flow of fluid to a point of application, as, for example, the flow of steam under thermostatic control to a process requiring heat. The object is to provide a control mechanism in which changes in flow to correct variations in a condition from a desired norm are effected by a rapid change followed by a slower change in the same direction.

For convenience I will describe an installation controlling the flow of the heating fluid, such as steam, for establishing and maintaining a desired temperature at the point of application and one in which the control is effected by pnuematic action. An illustrative example of such a mechanism exemplifying my invention is disclosed in the accompanying drawing.

The drawing is a diagrammatic view of a controlling installation with parts in section.

Referring to the drawing, in the arrangement shown steam flows from a main 3 to a tank 5 and the rate of flow is controlled by means of suitable valves. I have herein shown a valve 7 and a companion valve 9, the capacity of which latter may be controlled by means of a valve 11, the two valves 7 and 9 being arranged in parallel on branches of the steam supply pipe. The valves are actuated by means of suitable motors, herein diaphragm motors 11 and 13 respectively, operated by compressed air. In the example shown the valves are spring pressed toward closed position and opened by the admission of compressed air to the motors.

The flow of compressed air to the motors 11 and 13 may be controlled by control mechanism of the supply and waste valve type, and in the example shown a single mechanism of this kind controls the flow of air to the several motors, the flow being suitably differentiated by mechanism to be described. A supply and waste valve 17 in control head 19 alternatively admits air from a source of supply to flow to motors 11 and 13 or cuts off the supply and places the motors in communication with exhaust port 21 which opens to atmosphere. Valve 17 is mounted on a hollow stem carried by expansible diaphragms 23 which are in communication with an exhaust or bleeding port 25. The port 25 may be formed in a suitable adjustable "nozzle" 27 with which cooperates a valve or "flapper" 29 adapted to be moved in response to variations in conditions in the tank 5. In the present instance these variations are variations of temperature and I have shown a thermometric device in the form of a helical Bourdon tube 31 in communication with a suitable bulb 32 in the tank. The construction of the control couple embodying the "nozzle" 27 and "flapper" 29 and of the control head 19 may be essentially similar to that disclosed in the patent to Dixon 1,582,868, dated April 27, 1926.

The intake 15 and exhaust port 21 of the control head 19 are alternatively, under control of the valve 17, connected with motor 11 through a substantially unobstructed conduit 33 of large capacity so that the pressure in the motor 11 responds quickly to the action of the control head and valve 7 is moved rapidly. The control head, however, is connected with motor 13 through a restricted seepage passage 35 of small capacity, herein shown as a length of tubing of very small bore, so that air finds its way only very slowly from the control head to the motor 13 or vice versa. In communication with the conduit between the restricted passage 35 and the motor 13 I may interpose a "capacity" or chamber 37 of relatively large volume (in practice of the order of several cubic feet). Thus if air is flowing slowly through the restricted connection 35 toward the motor 13, the chamber 37 must fill as well as the chamber of the motor before a given pressure can be built up to move valve 9 to a given position, and conversely in exhausting the motor 13 chamber 37 must similarly exhaust.

With the parts in the position shown in the drawing, air entering at 15 passes through the hollow stem of valve 17 and exhausts through bleeding port 25. The diaphragms 23 thus remain collapsed, exhaust port 21 is closed and air flows freely to the motors 11 and 13, maintaining the valves 7 and 9 in a wide open position. Now, if the temperature rises and valve 29 closes port 25, diaphragms 23 expand, cutting off the supply of air through 15 and opening exhaust port 21. Motor 11 quickly exhausts through the unobstructed conduit 33, valve 7 closes and there is a sudden diminution in the rate of flow of steam from main 3. Air in the chamber of motor 13, however, and the volume of air in the "capacity" 37 exhausts only slowly through the restricted passage 35 so that valve 9 closes very gradually. If, now, the temperature falls below the desired value, valve 29 open again, air flows quickly to motor 11, promptly opening valve 7 and causing a marked and sudden increase in the flow of steam. Pressure in the motor 13 and chamber 37, however, can build up only slowly so that this sudden increase in flow is followed by a continued gradual increase as valve 9 slowly opens.

I have described a single control couple and a single control head for controlling the flow of air to the passages leading to the several motors, the supply of air being separated between the control head and the motors. Obviously these parts, or certain of them, might be duplicated for independent control of the motors, if desired.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A mechanism of the class described comprising a pair of passages for fluid, valve means controlling the same, motors for operating the valve means to control the passages respectively, a control mechanism of the supply and waste type responsive to the fluctuations of a variable for governing the supply of pressure fluid to said motors and comprising in the one instance a substantially unobstructed passage and in the other a restricted passage having in communication therewith on the side of the motor a chamber of relatively great capacity.

2. A mechanism of the class described comprising a pair of passages for fluid, valve means controlling the same, motors for operating the valve means to control the passages respectively, a control mechanism of the supply and waste type responsive to the fluctuations of a variable for governing the supply of pressure fluid to said motors and comprising in the one instance a substantially unobstructed passage and in the other a passage having in communication therewith on the side of the motor a chamber of relatively great capacity.

3. A mechanism of the class described comprising valve means for controlling the flow of a fluid, a pair of motors for operating the valve means, control mechanism of the supply and waste type governing the supply of pressure fluid to said motors through conduits comprising respectively a substantially unobstructed passage for pressure fluid to one of the motors and a passage to the other motor having in communication therewith a chamber of relatively great capacity.

4. In a control mechanism for governing valve-operating motors, a valve controlling the supply of pressure fluid to the motors for operating the same and controlling two conduits leading from the valve to the motors respectively, one conduit being substantially unobstructed and the other having in communication therewith a chamber of relatively great capacity.

5. In a control mechanism for governing valve-operating motors, a valve controlling the supply of pressure fluid to the motors for operating the same and controlling two conduits leading from the valve to the motors respectively, one conduit being substantially unobstructed and the other including a restricted seepage connection and a chamber of relatively great capacity at the further side thereof.

6. In a control mechanism for governing valve-operating motors, a mechanism of the supply and waste type responsive to the fluctuations of a variable for effecting flow of pressure fluid to and from the motors, a substantially unobstructed conduit to one of said motors for said flow effective to permit a rapid change in pressure actuating the motor to move a valve operated thereby to effect a flow in a given direction, and a second conduit to another motor comprising a chamber of relatively large capacity effective to permit a gradual change in pressure actuating said motor means to move a valve operated thereby to effect a further flow in the same direction.

In testimony whereof, I have signed my name to this specification.

CLESSON E. MASON.